United States Patent [19]

Yueh et al.

[11] 4,084,008

[45] Apr. 11, 1978

[54] INSTANTIZED POTATO PRODUCTS AND METHOD OF MAKING SAME

[75] Inventors: Mao H. Yueh; Herman W. Mueller, both of Minneapolis, Minn.

[73] Assignee: General Mills, Inc., Minneapolis, Minn.

[21] Appl. No.: 595,931

[22] Filed: Jul. 14, 1975

[51] Int. Cl.$^2$ ............................................. A23L 1/216
[52] U.S. Cl. .................... 426/464; 426/473; 426/510
[58] Field of Search ............... 426/456, 464, 458, 457, 426/459, 460, 461, 463, 473, 508, 509, 510

[56] References Cited

U.S. PATENT DOCUMENTS

| | | | |
|---|---|---|---|
| 3,009,817 | 11/1961 | Hendel et al. | 426/473 X |
| 3,615,724 | 10/1971 | Sech | 426/473 X |
| 3,635,729 | 1/1972 | Englar et al. | 426/464 X |
| 3,725,087 | 4/1973 | Miller et al. | 426/473 |
| 3,812,274 | 5/1974 | Weaver et al. | 426/473 X |
| 3,821,446 | 6/1974 | Esbey et al. | 426/473 X |

OTHER PUBLICATIONS

Arsdel et al., Food Dehydration, vol. 2, 2nd Ed., 1973, Avi Pub. Co., Inc., Westport Conn., pp. 90, 96–110, 139, 140.

*Primary Examiner*—S. Leon Bashore
*Assistant Examiner*—Kenneth M. Schor
*Attorney, Agent, or Firm*—Gene O. Enockson

[57] ABSTRACT

Fresh, whole potatoes are washed, peeled and cut into pieces. The pieces are blanched, treated in a sulfite solution and then partially dehydrated to a moisture content of between about 35–65% by weight. The partially dehydrated slices are then steam cooked and subsequently dehydrated to a shelf stable moisture content of less than 10 percent.

12 Claims, No Drawings

INSTANTIZED POTATO PRODUCTS AND METHOD OF MAKING SAME

BACKGROUND OF THE INVENTION

This invention relates to an instantized dehydrated potato product and a process for producing such a product.

A variety of instantized food products are readily available to the consumer. However, the presently available instantized potato pieces are not completely satisfactory. For example, present dehydrated sliced and diced potatoes require a substantial amount of time for rehydration and require additional cooking before they are satisfactory for use. Where rehydration and cooking time is significantly reduced as is the case with some quick cooking potato products prepared by puffing, the products lack good textural and eating qualities and are not satisfactory substitutes for regular potatoes. It is an object of the present invention to provide an instantized potato piece, such as a slice, a dice, or a shred that will rehydrate very rapidly, for example, in about three minutes when soaked in hot water. The present invention also provides a potato product that upon rehydration is suitable for eating with or without further cooking.

THE PRESENT INVENTION

When carrying out the present invention, one may utilize any suitable type of fresh potato such as Russets, Kenebecks, Netted Gems, as well as, various other reds or whites. The potatoes are preferably subjected to a washing or cleansing step such as in rotary drums or cylindrical washers. The potatoes, for example, may be heavily sprayed with cold water and passed between revolving bristle brushes. This is to remove any adhering soil and reduce the number of contaminating microorganisms present before removing the potato skins. The potatoes may be inspected and any unfit or undesirable potatoes may be discarded.

The washed potatoes may then be passed through a conventional potato peeler which removes the skin from the potatoes. The peeling may be carried out by any desired process. The typical commercial peeling is by steam and lye peeling. Potato losses during peeling should be minimized.

The peeled potatoes may be cut into the desired size, such as at least 0.05 inches in thickness. The potato may, for example, be diced in ½ inch cubes. Alternatively, the potato pieces may be slices, typically circular having a diameter about the size of the potato and thickness of perhaps ⅛ of an inch. Of course, pieces of various other sizes and shapes may be cut as desired. For example, the pieces may be as large as desired and may even be a whole skinned potato. Various types of cutting equipment are commercially available. Typically, the potatoes are fed to a plurality of cutter blades together with a stream of water. The water serves as a lubricant during the cutting. The potato pieces may be prepared by extrusion of a potato dough.

The potato pieces next may be blanched either in a steam bath or in boiling water for about 2 minutes. Typically, the blanching may be carried out by striking the potato pieces with successive live steam jets as the pieces are carried along on a conveyor belt. The live steam is primarily for the purpose of destroying or inactivating the enzymes thereby preventing darkening and/or other quality changes during processing and storage of the potato pieces. The blanching also serves to reduce microbiological contamination. The blanching time may vary depending on the temperature used, size of potato pieces, product load, and other factors; however, the time will typically be about 2 to 12 minutes.

The blanched potatoes may be treated in a chemical bath, for example, including citric acid, ascorbic acid, and sodium bisulfite to reduce non-enzymatic browning or scorching during subsequent heat processing steps. The sodium bisulfite may be replaced with any other suitable sulfite such as sodium sulfite, sodium metabisulfite or combinations of such materials.

Potato pieces may be partially dehydrated to an overall moisture content of about 35-65% to form a toughened surface layer (the term "percent" and the like as used herein will refer to percent by weight unless otherwise indicated). The potato pieces may be dehydrated, for example, in a vacuum drier or they may be heated at an elevated temperature in a substantially dry atmosphere. The partially dehydrated pieces may still be uncooked. After partial drying, the potato pieces are steamed such as in an autoclave until they are substantially cooked. It has been found highly advantageous to partially dehydrate the pieces before the cooking step. For example, the pieces have a greater inclination to maintain their integrity which means easier handling during processing and better product eating qualities.

The potato pieces may be then dehydrated, for example, in a conventional oven at a temperature of about 110°–270° F. until they reach a shelf stable moisture content of less than 10% typically about 7 or 8% by weight. The pieces may be dehydrated as the temperature is lowered step-wise. This permits use of higher temperatures during a portion of the dehydration step and yet avoids charring, case hardening or cracking. The pieces may be dehydrated otherwise such as by alternating steps of drying, resting and drying. If desired, the dehydration may be by vacuum drying, microwave drying, or drying under controlled humidities.

The present dehydrated potato pieces may be used by the consumer in a manner such as previously known dehydrated potato pieces are used. However, the present potato pieces rehydrate much more readily than known dehydrated potato pieces. For example, ⅛ inch potato slices of the present invention will rehydrate in only about 3 to 5 minutes when soaked in hot water such as at 200° F. Moreover, the rehydrated potato pieces are already cooked and need no further cooking. The rehydrated potato pieces may be used as fried potatoes, potato salads, scalloped potatoes, creamed potatoes, hash browns and the like.

The following examples are illustrative of specific embodiments of the present invention.

EXAMPLE I

Instantized potato slices were prepared according to the present invention by washing, peeling, and then hand slicing whole potatoes into pieces having a thickness varying from about 0.05 to 0.25 inches. The pieces were blanched over a boiling water bath for about 2 minutes. The potato slices were then dipped in an aqueous solution of citric acid and sodium bisulfite for about 30 seconds and then drained. The solution included 0.5 percent citric acid and 0.5 percent sodium bisulfite. The pieces were then partially dried at 250° F. for about an hour. The partially dried potato pieces had a moisture content in the range of 35-65%. The partially dried potato pieces were steamed in an autoclave for 8 minutes at 21 p.s.i.g. steam pressure. The pieces were then dried in a conventional oven at a temperature of 270° which was stepwise lowered to 110° F. The resulting pieces were found to readily rehydrate when mixed with boiling water after standing for about 3 to 8 minutes.

EXAMPLE II

Instantized potato was prepared according to the present invention substantially as described in Example I except the pieces were cut into ¼ inch dices. The resulting product rehydrated well upon mixing with boiling water and being allowed to stand for about 4 to 5 minutes. Upon rehydration the shreds were ready for eating.

EXAMPLE III

Instantized potato shreds were prepared according to the present invention as described in Example I except the peeled potatoes were passed through a Hobart TM rotor vegetable shredder. The size of the shreds was approximately ⅛ × ⅛ × 1 inch. The dehydrated instantized shreds rehydrated well upon mixing with boiling water and soaking for about 3 minutes. Upon rehydration, the shreds were ready for eating.

EXAMPLE IV

Instantized potato slices were prepared according to the present invention substantially as described in Example I. The slices were approximately 0.1 inch in thickness. The moisture content following partial drying was 64.1%. The moisture content upon steam cooking was 62.9% and upon final drying was 5.8%. The drying was carried out by heating the cooked potato slices at 270° F. for 1 hour, then at 160° F. for 1 hour and finally at 110° F. for about 16 hours. The dry pieces were rehydrated by mixing with boiling water and soaking for 3 minutes. Upon rehydration, the slices were ready for eating.

EXAMPLE V

For comparison purposes, the dehydrated slices of Example IV were rehydrated at various temperatures. The results are shown in the following Table I:

Table I

| Sample | Initial Water Temperature ° F. | Hydration Time Minutes | Temp. After Hydration, ° F. |
|---|---|---|---|
| A | 212 | 3 | 175 |
| B | 126 | 12 | 115 |
| C | 70 | 25 | 70 |

Each of the samples were found to have good eating qualities following rehydration.

EXAMPLE VI

Example IV was repeated except the slices were 0.04 inch in thickness and the steam cooking was carried out for 6 minutes at 15 p.s.i.g. jacket pressure. The finished product rehydrated upon mixing with boiling water and soaking for 3 minutes.

EXAMPLE VII

Example VI was repeated except the steam cooking was carried out with steam at less than 1 p.s.i.g. jacket pressure. The finished product was found to have substantially the same qualities as the product of Example VI.

EXAMPLE VIII

Instantized potato was prepared according to the present invention by soaking commercially available whole, sliced, dry potato pieces in water at room temperature for 2 hours. The rehydrated pieces were partially dehydrated as described in Example I. The pieces were then steam cooked for 10 minutes at 21 p.s.i.g. jacket pressure. The pieces were then dehydrated as described in Example I. The final product was found to have properties substantially like the product of Example V.

EXAMPLE IX

Instantized potato was prepared as described in Example VIII except the potato pieces had been prepared by extrusion of a potato dough. The pieces were about 0.045 inch in thickness. The final instantized product required about 5 minutes soaking in the 212° F. water in order to achieve complete hydration.

The embodiments of the invention in which an exclusive property or privilege is claimed are defined as follows:

1. A method for preparing dehydrated instantized potato pieces comprising cutting a fresh potato into pieces, blanching the pieces, dehydrating the pieces to a moisture content in the range of about 35–65% by weight, steam cooking the partially dehydrated pieces and then dehydrating the cooked pieces to a moisture content of less than 10% by weight.

2. The method of claim 1 wherein the cooked pieces are dehydrated at a temperature of about 110° to 270° F.

3. The method of claim 1 wherein said pieces are dices.

4. The method of claim 3 wherein said dices are cubes of about one-inch in each said dimension.

5. The method of claim 1 wherein said pieces are slices.

6. The method of claim 1 wherein said pieces are shreds.

7. The method of claim 2 wherein said cooked pieces are dehydrated to a moisture content of about 7 to 8% by weight.

8. A method for preparing dehydrated instantized potato pieces comprising dehydrating an uncooked blanched potato piece to a moisture content in the range of about 35–65% by weight, steam cooking the partially dehydrated piece and then dehydrating the cooked piece to a shelf stable moisture content of less than 10% by weight.

9. The method of claim 8 wherein said potato piece is a potato piece formed from a potato dough by extrusion.

10. A method for preparing instantized potato pieces comprising treating an uncooked blanched potato piece having a surface portion by partially dehydrating said surface portion thereby providing a toughened surface portion, said piece after said partial dehydration having a moisture content of about 35–65% by weight, then steam cooking said potato piece and subsequently dehydrating the piece to a shelf stable moisture content of less than 10% by weight.

11. The method of claim 10 wherein said potato piece has a thickness of at least about 0.05 inches.

12. The method of claim 11 wherein said partial dehydration is by heat treatment.

* * * * *